(12) United States Patent
Marcjan

(10) Patent No.: US 7,797,637 B2
(45) Date of Patent: *Sep. 14, 2010

(54) MULTI-LAYER GRAPHICAL USER INTERFACE

(75) Inventor: Cezary Marcjan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

This patent is subject to a terminal disclaimer.

(21) Appl. No.: 11/381,477

(22) Filed: May 3, 2006

(65) Prior Publication Data

US 2006/0190834 A1    Aug. 24, 2006

Related U.S. Application Data

(63) Continuation of application No. 10/460,912, filed on Jun. 13, 2003, now Pat. No. 7,051,282.

(51) Int. Cl.
G06F 3/048    (2006.01)

(52) U.S. Cl. ............... 715/764; 715/765; 715/759

(58) Field of Classification Search ........... 715/810, 715/835, 733, 764–769, 751–759, 802; 709/224, 709/225, 248; 707/100
See application file for complete search history.

(56) References Cited

U.S. PATENT DOCUMENTS

| | | | | |
|---|---|---|---|---|
| 5,008,853 A | * | 4/1991 | Bly et al. | 715/751 |
| 5,220,657 A | | 6/1993 | Bly et al. | |
| 5,241,656 A | * | 8/1993 | Loucks et al. | 715/794 |
| 5,574,898 A | | 11/1996 | Leblang et al. | |
| 5,745,711 A | | 4/1998 | Kitahara et al. | |
| 5,793,365 A | * | 8/1998 | Tang et al. | 715/758 |
| 5,995,098 A | * | 11/1999 | Okada et al. | 715/752 |
| 6,061,684 A | | 5/2000 | Glasser et al. | |
| 6,112,024 A | | 8/2000 | Almond et al. | |
| 6,201,859 B1 | | 3/2001 | Memhard et al. | |
| 6,208,344 B1 | * | 3/2001 | Holzman et al. | 715/846 |
| 6,240,421 B1 | * | 5/2001 | Stolarz | 707/102 |
| 6,266,058 B1 | | 7/2001 | Meyer | |
| 6,308,173 B1 | | 10/2001 | Glasser et al. | |

(Continued)

FOREIGN PATENT DOCUMENTS

JP    63282523 (A)    11/1988

(Continued)

OTHER PUBLICATIONS

Flavio De Paoli, et al., "Requirements for a Layered Software Architecture Supporting Cooperative Multi-User Interaction", Proceedings of ICSE, 1996, pp. 408-417.

(Continued)

*Primary Examiner*—Tadeese Hailu
(74) *Attorney, Agent, or Firm*—Lee & Hayes, PLLC

(57) ABSTRACT

A multi-layer graphical user interface provides multiple types of information in at least two layers of a common display space, such as a window. In one implementation, a shared network folder includes two layers of display objects to separately represent files contained in the folder and users with whom the folder is shared. The first or top layer may represent the files with conventional words, icons or other symbols. The second or lower level may represent the users with whom the folder is shared with words, icons or other symbols that are dimmed, blurred, or otherwise de-emphasized relative to the top layer.

20 Claims, 4 Drawing Sheets

U.S. PATENT DOCUMENTS

| | | | |
|---|---|---|---|
| 6,362,892 B1 | 3/2002 | Lee et al. | |
| 6,384,849 B1 | 5/2002 | Morcus et al. | |
| 6,411,312 B1 * | 6/2002 | Sheppard | 715/769 |
| 6,633,310 B1 | 10/2003 | Andrew et al. | |
| 6,636,250 B1 | 10/2003 | Gasser | |
| 6,754,905 B2 * | 6/2004 | Gordon et al. | 725/38 |
| 6,915,490 B1 * | 7/2005 | Ewing | 715/794 |
| 6,987,512 B2 * | 1/2006 | Robertson et al. | 345/427 |
| 2001/0056434 A1 * | 12/2001 | Kaplan et al. | 707/104.1 |
| 2002/0138602 A1 | 9/2002 | Vinberg | |
| 2003/0014415 A1 | 1/2003 | Weiss et al. | |
| 2004/0046784 A1 | 3/2004 | Shen et al. | |

FOREIGN PATENT DOCUMENTS

| | | |
|---|---|---|
| JP | 2068654 (A) | 3/1990 |
| JP | 4090036 (A) | 3/1992 |
| JP | 6004258 (A) | 1/1994 |
| JP | 6103017 (A) | 4/1994 |
| JP | 6323819 (A) | 11/1994 |
| JP | 9244848 (A) | 9/1997 |
| JP | 11203017 (A) | 7/1999 |
| JP | 2000089890 (A) | 3/2000 |
| JP | 2000285039 (A) | 10/2000 |
| JP | 2001159940 (A) | 6/2001 |
| JP | 2001312342 (A) | 11/2001 |
| JP | 2002105447 A | 4/2002 |
| JP | 2002116856 (A) | 4/2002 |
| JP | 2004511829 (T) | 4/2004 |
| RU | 2144283 C1 | 1/2000 |
| WO | WO9837483 (A1) | 8/1998 |

OTHER PUBLICATIONS

International Search Report, PCT/US04/18384, mailed Jun. 17, 2005.
Decision on Grant from Russian Patent Office for Application No. 2005138784, mailed on Oct. 8, 2009, 4 pages.
Dorot, et al., "Explanatory Dictionary of Modern Computer Lexicology", Sankt-Peterburg, BHV-Peterburg, 2001, p. 126, 177, 179.
Orlov, English-Russian Dictionary of Networks and network techniques, Moscow, Solon, 1977, p. 264.
Pershikov, et al., "Explanatory Dictionary in Informatics", Finances and Statistics, Moscow, 1995, p. 31, 53, 349.
Russian Office Action from Application No. 2005138784, mailed on Apr. 24, 2009, 12 pages.
Notice of Rejection (with English Translation) from Japanese Patent Office for Application No. 2006-533664, mailed on Jan. 19, 2010, 7 pages.
Supplementary European Search Report from European Patent Office for Application No. EP04754857, mailed on Dec. 18, 2009, 3 pages.

* cited by examiner

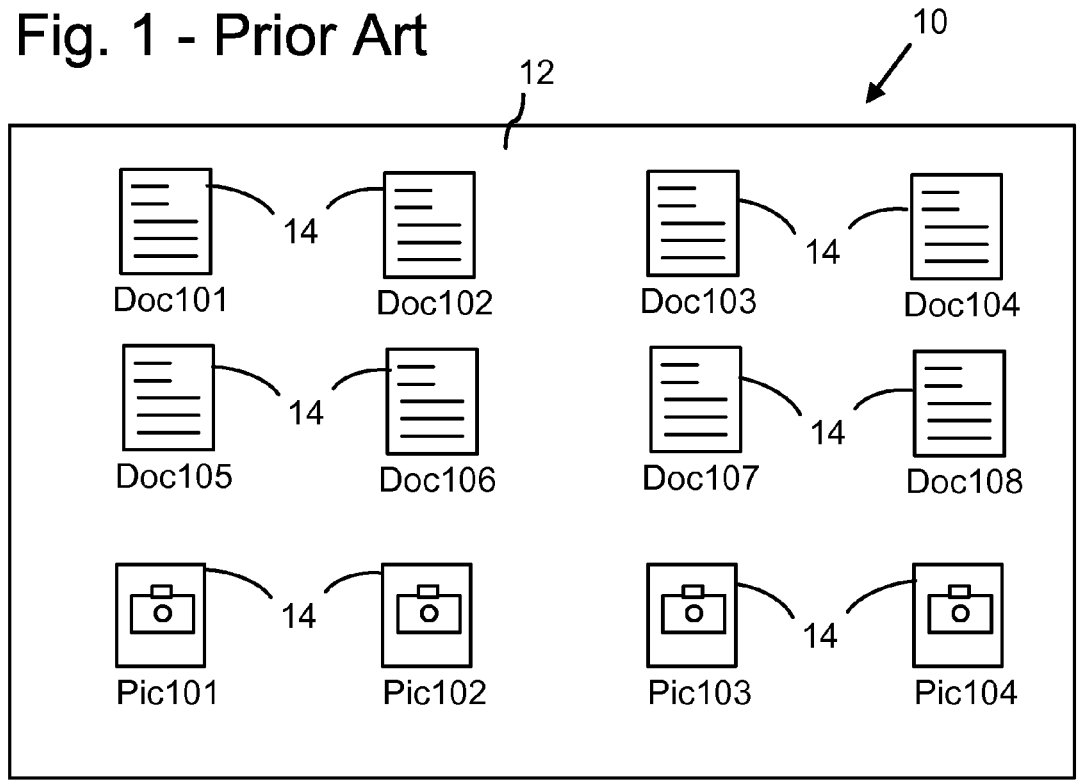
Fig. 1 - Prior Art
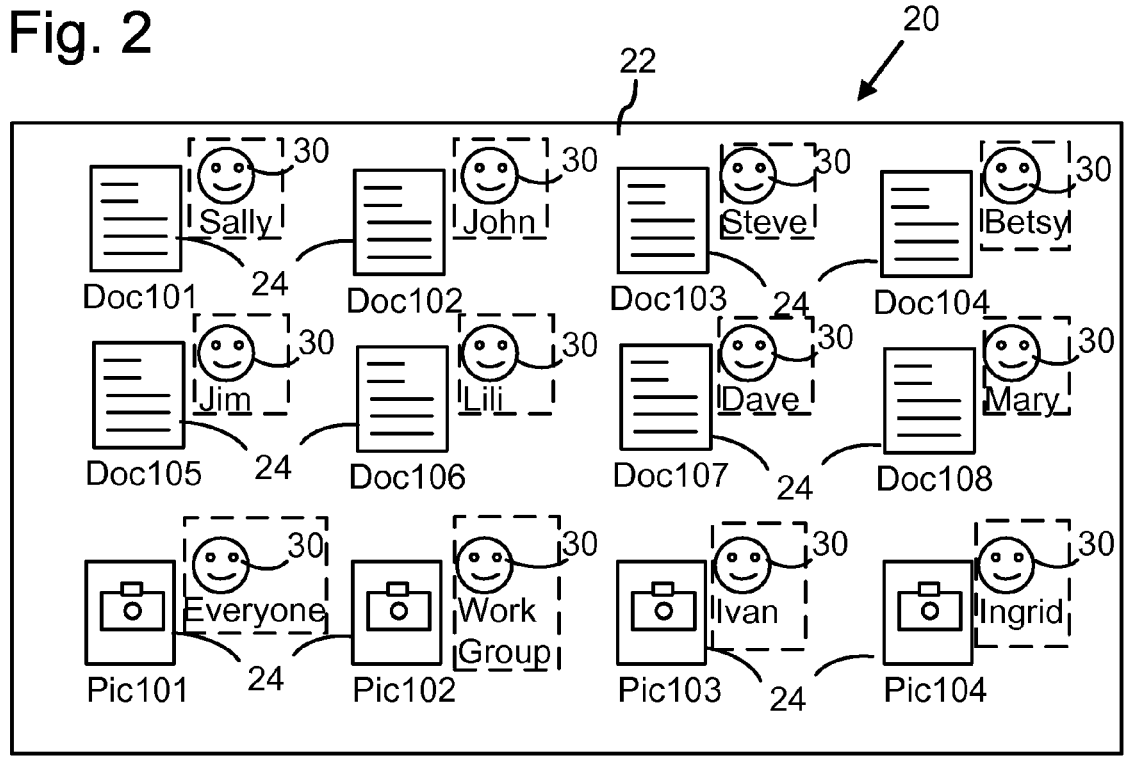
Fig. 2

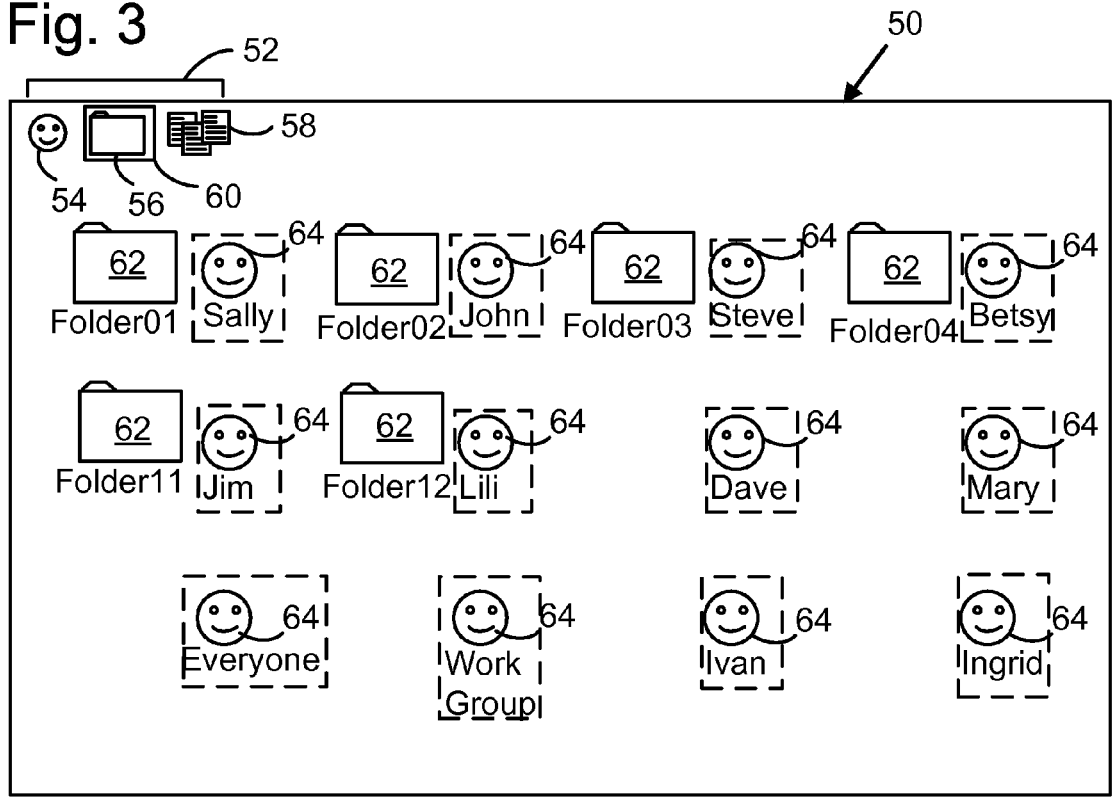
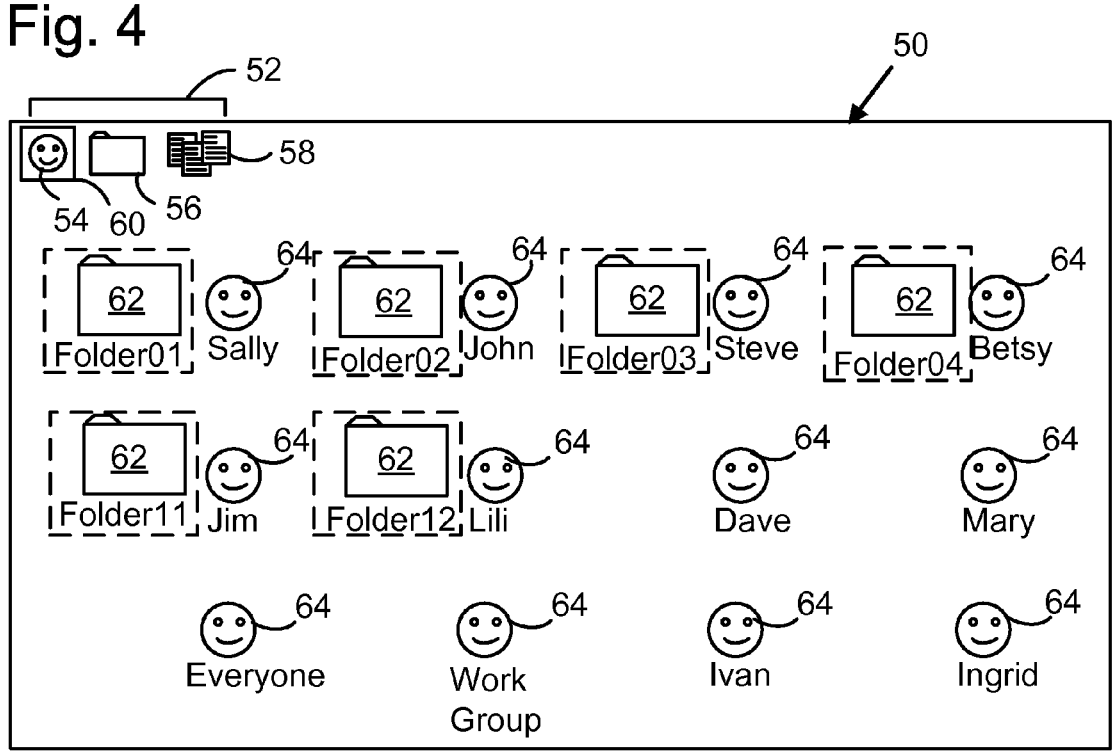

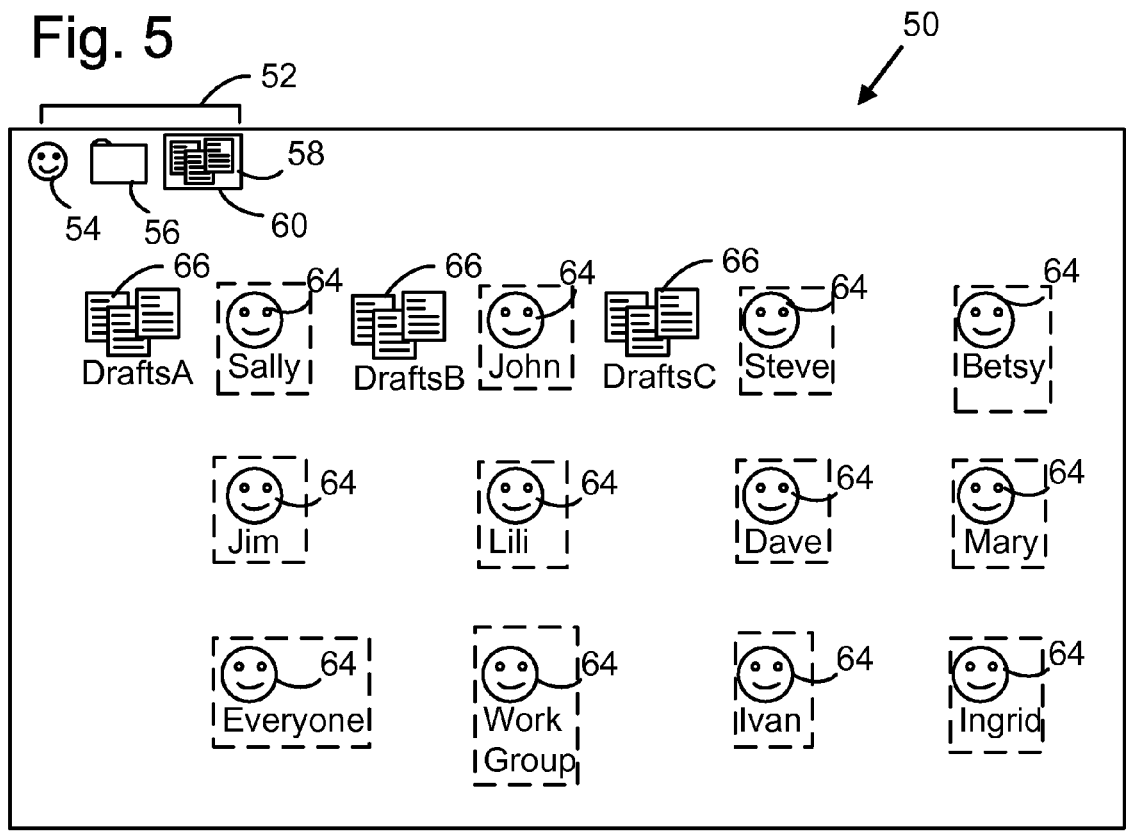
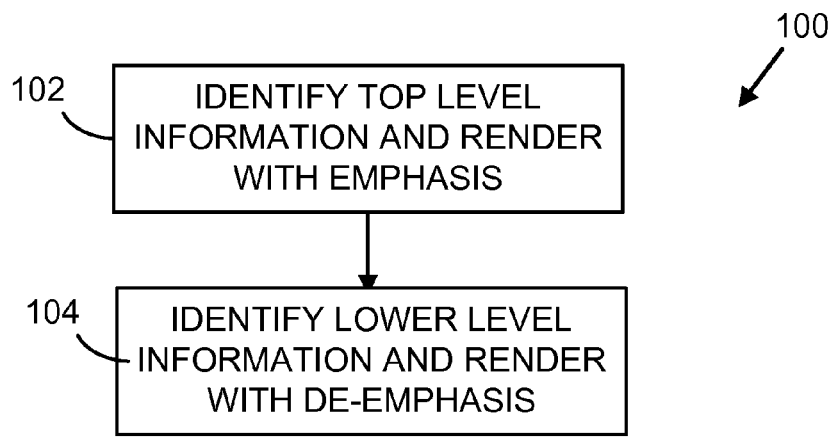

MULTI-LAYER GRAPHICAL USER INTERFACE

CROSS-REFERENCE TO RELATED APPLICATIONS

This application is a continuation of U.S. patent application Ser. No. 10/460,912, which was filed on Jun. 13, 2003 and entitled, "MULTI-LAYER GRAPHICAL USER INTERFACE". The entirety of the aforementioned application is incorporated herein by reference.

FIELD OF THE INVENTION

The present invention relates to graphical user interfaces and, in particular, to a graphical user interface that renders different types of information in different layers of a shared display area.

BACKGROUND AND SUMMARY OF THE INVENTION

Many graphical user interfaces for computers are based on a desktop metaphor that creates a graphical environment simulating work at a desk. These graphical user interfaces typically employ a windowing environment within the desktop. The windowing environment presents the user with specially delineated areas of the screen called windows, each of which is dedicated to a particular application program, file, document, or group of files (e.g., a folder).

FIG. 1 is an illustration of a prior art graphical user interface 10 of a computer network folder 12 containing multiple computer files 14, such as document files, photo files, etc. It will be appreciated that computer files 14 in FIG. 1 are actually icons that represent or designate the files, but in the terminology of the art the icons or other symbols representing objects are referred to as the objects themselves. User interface 10 is rendered on display screens of user computers, for example.

Computer network folder 12 represents a computer or network space within which computer files 14 are stored. In the earliest personal computers, the folder in which a group of computer files was stored was dedicated to and accessible from only one computer. With the networking of computers, a folder such as computer network folder 12 may be accessible by many users from many different computers on a network.

In a computer network, for example, some network folders might be publicly shared and accessible to virtually any user on the network, and other folders might have access or sharing that is limited only to specified users. Folders with limited access or sharing would typically contain sensitive or private information that is not needed by all network users.

In prior art graphical user interface 10, computer files 14 are shown in computer network folder 12 in the same manner regardless of whether network folder 12 is widely shared, shared on a limited basis, or entirely private. A single layer of information, computer files 14, is rendered to identify the contents of folder 12. The single-layered representation does not indicate any other information or property, such as the extent to which files in the folder are shared, even though such a property could be very important to how a user works with the folder contents.

As a result, current implementations of shared computer spaces, like network folders or "shares," can facilitate serious breaches of network security. When they create shared network spaces such as folder 14, users do not always maintain the access rights (i.e., shared access) so that in time the shared status of the space can be forgotten. As a result, sensitive files might then be stored in a network space that is shared with users for whom access rights are not intended.

Accordingly, the present invention provides a multi-layer graphical user interface that provides multiple types of information in at least two layers of a common display space, such as a window or desktop. In one implementation, a shared network folder includes two layers of display objects to separately represent files contained in the folder and users with whom the folder is shared. The first or top layer may represent the files with conventional words, icons or other symbols. The second or lower level may represent the users with whom the folder is shared with words, icons or other symbols that are dimmed, blurred, or otherwise de-emphasized relative to the top layer.

The multi-layer graphical user interface allows multiple distinct types of information to be rendered graphically in a common display space. As a result, the information of primary significance (e.g., the files) can be readily discernible by the user, while significant related information is rendered without degrading the display of primary significance with a clutter of display objects. In one implementation, the distinct types of information to be rendered may be selected from more than two distinct types of information in a type control bar.

Additional objects and advantages of the present invention will be apparent from the detailed description of the preferred embodiment thereof, which proceeds with reference to the accompanying drawings.

BRIEF DESCRIPTION OF THE DRAWINGS

FIG. 1 is an illustration of a prior art graphical user interface of a computer network folder.

FIG. 2 is an illustration of a multi-layer graphical user interface according to the present invention.

FIGS. 3-5 illustrate a multi-layer graphical user interface having a type control bar for rendering multiple graphical controls of more than two types.

FIG. 7 illustrates a flow diagram of a computer-implemented multi-layer user interface method.

DETAILED DESCRIPTION OF PREFERRED EMBODIMENTS

Figure 6:
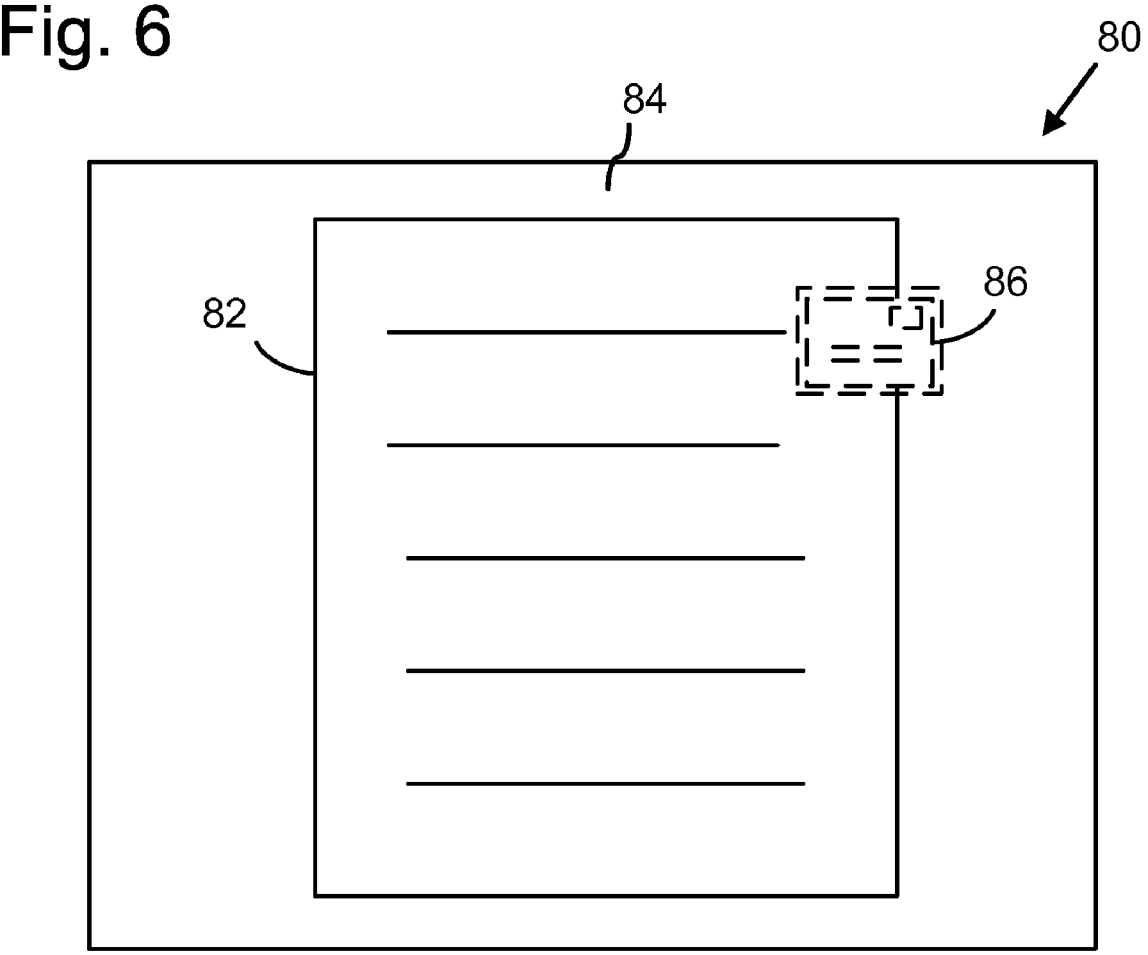
FIG. 6 illustrates a multi-level user interface.

FIG. 2 is an illustration of a multi-layer graphical user interface 20 according to the present invention. Multi-layer graphical user interface 20 is shown with regard to a computer network folder 22 containing multiple computer files 24, such as document files, photo files, etc. It will be appreciated that computer files 24 in FIG. 2 are actually icons that represent or designate the files, but in the terminology of the art the icons or other symbols representing objects are referred to as the objects themselves. User interface 20 is rendered on a display screen of user computer, for example.

Computer network folder 22 represents a computer or network space within which computer files 24 are stored. Network folder 22 may be accessible by many users from many different computers on a network. User interface 20 further includes one or more (multiple shown) user icons 30 representing users or groups of users with whom the network folder 22 is shared. Some of the user icons 30 may each represent multiple users, such as the "Everybody" icon representing all network users and the "Work Group" icon representing a user's immediate group of colleagues.

User icons 30 in FIG. 2 are illustrated within boxes that are drawn with broken lines to represent icons 30 being dimmed, blurred, faded, or otherwise de-emphasized relative to files 24 when rendered on a computer display. By analogy, de-emphasized user icons could be analogous to a watermark on paper. As other examples, user icons 30 could be de-emphasized by being rendered with different colors or shades relative to files 24. As a result, computer files 24 represent a top or front layer of user interface 20, and user icons 30 represent a lower or background layer.

User icons 30 provide a user viewing user interface 20 with a clear and integral indication of the shared status of network folder 22 and the uses with whom folder 22 is shared. In one implementation, each user icon 30 also functions as a link or control for accessing a user interface (not shown) to modify that user's share or access rights to folder 22 without the need to change to a separate view or application. As a result, files 24 and user icons 30 provide access to underlying information or functionality whether rendered as a top layer or a lower layer of user interface 20.

FIG. 2 illustrates a multi-level user interface 20 that renders multiple graphical controls of two types (i.e., files 24 and user icons 30) in each of two distinct levels. As another implementation of the present invention, FIGS. 3-5 illustrate a multi-layer graphical user interface 50 for rendering multiple graphical controls of more than two types. User interface 50 includes a type control bar 52 having controls 54, 56, and 58 representing three different types of data, objects, controls, etc. In this illustration, controls 54, 56, and 58 correspond to a users control, a folders control, and a drafts control, respectively.

FIG. 3 illustrates with a box 60 activation of folder control 56. Folder control 56 may be activated in any conventional graphical user interface manner (e.g., "clicking on it"), and an indication may be indicated in any manner. Box is merely an example of indicating activation.

Activation of folder control 56 functions to bring to a top level of user interface 50 folders 62 (i.e., folder icons) representing, for example, folders or sub-folders in a network space. User icons 64 are illustrated within boxes that are drawn with broken lines to indicate that icons 64 are rendered on a computer display screen in a de-emphasized manner (i.e., at a lower level) relative to folders 62. For example, folder 62 might be moved to the top level of user interface 50 so a user could manage or access information or files within the folders.

FIG. 4 illustrates with box 60 activation of users control 54. Users control 54 may be activated in any conventional graphical user interface manner, and an indication may be indicated in any manner. Activation of users control 54 functions to bring to a top level of user interface 50 user icons 64 representing, for example, users having share rights to folders 62. Folders 62 are illustrated within boxes that are drawn with broken lines to indicate that folders 62 are rendered on a computer display screen in a de-emphasized manner (i.e., at a lower level) relative to user icons 64. For example, user icons 64 might be moved to the top level of user interface 50 so a user could manage or modify share or access rights for the users represented by user icons 64.

FIG. 5 illustrates with box 60 activation of drafts control 58. Drafts control 58 may be activated in any conventional graphical user interface manner, and an indication may be indicated in any manner. Activation of drafts control 58 functions to bring to a top level of user interface 50 draft icons 66 representing, for example, files that have multiple associated drafts or versions. With user icons in FIG. 4 previously being at the top level, activation of drafts control 58 causes the user icons 64 to move to the lower display level and the previously lower level folder icons 62 to be dropped from the display. User icons 64 are illustrated within boxes that are drawn with broken lines to indicate that icons 64 are rendered on a computer display screen in a de-emphasized manner (i.e., at a lower level) relative to drafts icons 66.

It will be appreciated that type control bar 52 can include any number of controls to accommodate any corresponding number of object types. In this implementation, two levels of objects are rendered at a time, with the top level of objects being rendered with emphasis relative to the lower level. As a result, activation of a control from type control bar 52 causes the objects for the activated type to be moved to the top level while the previously top level objects are rendered at the lower level.

Although described with reference to computer file management applications, it will be appreciated that multi-layer graphical user interfaces according to the present may be used in a variety of user interface applications. As one example, user notifications or system status indications could be rendered in a user's active window as a de-emphasized or background layer. Such user notifications or system status indications could include the arrival of an email message, an appointment reminder, a system resource warning, etc. In each of these cases, an indication could be rendered within the window of an unrelated application to notify the user in a noticeable, but unobtrusive and nondisruptive manner.

FIG. 6 illustrates a multi-level user interface 80 that renders, for example, a text document 82 within a word processing application window 84. Text document 82 represents a top layer of the user interface 80. A notification indicator 86, such as an icon indicating that an email message has been received, is rendered as a second layer within window 84. Notification indicator 86 is rendered in a dimmed, blurred, faded or other de-emphasized manner relative to text document 82. The de-emphasized rendering of notification indicator 86 is indicated in FIG. 6 by illustrating indicator 86 within a box that is drawn with broken lines.

As another example, multi-layer user interfaces according to this invention could be applied to Web page applications, such as to indicate users who are active on a page, users who are active on a page, related pages to the current one (icons), weather, related people, people near-by, etc.

FIG. 7 is a flow diagram of a computer-implemented multi-layer user interface method 100 for providing graphical user interface displays such as those illustrated in FIGS. 2-5.

In step 102, a top level information type is identified and rendered on a computer display screen in an emphasized (e.g., conventional) manner.

In step 104, a lower level information type is identified and rendered on a computer display screen in a de-emphasized manner, which may include blurring, fading, shading, etc. relative to a conventional rendering.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A multi-layer graphical user interface on a computer display, comprising:
   a type control bar that includes a plurality of controls, the plurality of controls rendered in a window of the graphical user interface and the plurality of controls for selecting graphical displays of object types, the object types rendered in the window of the graphical user interface separate from the plurality of controls, each window having multiple layers, and each of the plurality of controls corresponds to an object type; and
   a component that graphically renders the object type in an emphasized manner on the window based on a user selecting one of the plurality of controls corresponding to the object type, the user selection of the one of the plurality of controls corresponding to an object type results in the user de-selecting one of the plurality of controls corresponding to a previously selected object type, and the component further graphically renders the object types other than the selected object type in a de-emphasized manner, wherein the object type graphically rendered in the emphasized manner is in a top layer of the window and the object types other than the selected object type are in a layer of the window other than the top layer.

2. The user interface of claim 1, the plurality of controls includes at least one of a users control, a folders control, or a drafts control.

3. The user interface of claim 2, the users control corresponds to one of the object types representing a user's share or access rights to one or more computer file objects.

4. The user interface of claim 2, the folders control corresponds to one of the object types representing folders or subfolders in a network space.

5. The user interface of claim 2, the drafts control corresponds to one of the object types representing files that have multiple associated drafts or versions.

6. The user interface of claim 1, the de-emphasized manner on the user interface is one of dimming, blurring, fading, shading, broken lines, or watermarking of the object type.

7. The user interface of claim 1, the emphasized manner on the window is a conventional rendering of the object type.

8. A multi-layer graphical user interface method, comprising:
   employing a processor executing computer executable instructions stored on a computer readable storage medium to implement the following acts:
   providing a plurality of controls in a type control bar for activating graphical displays of object types in a computer display space, each of the plurality of controls corresponds to an object type, the computer display space having at least a top layer and a bottom layer within each window of the user interface, and the plurality of controls displayed in the computer display space separate from the object type; and,
   bringing the object type to a top layer and a lower layer of the window based on a user activating or de-activating one of the plurality of controls corresponding to the object type.

9. The method of claim 8, the plurality of controls includes at least one of a users control, a folders control, or a drafts control.

10. The method of claim 9, the users control symbolizes one of the object types representing a user's share or access rights to one or more computer file objects.

11. The method of claim 9, the folders control symbolizes one of the object types representing folders or subfolders in a network space.

12. The method of claim 9, the drafts control symbolizes one of the object types representing files that have multiple associated drafts or versions.

13. The method of claim 8, the lower layer of the window is one of dimming, blurring, fading, shading, broken lines, or watermarking of the object type.

14. The method of claim 8, the top layer of the window is a conventional rendering of the object type.

15. A multi-layer graphical user interface on a display of a computer system, comprising:
   a common display space having at least two layers, the common display space within the graphical user interface comprising each window of the graphical user interface or an active application, and the common display space including a type control bar that includes a plurality of controls for selecting graphical displays of object types, wherein the object types are rendered in a window of the graphical user interface separate from the plurality of controls;
   a primary display component that identifies one or more objects of a top level information type and brings the one or more objects of the top level information type to a top layer of the common display space; and
   a secondary display component that identifies one or more objects of a lower level information type and brings to a layer other than the top layer the one or more objects of the lower level information type with de-emphasis relative to the top layer of the common display space, the de-emphasized objects of the lower level information type remaining noticeable in the other than top layer of the common display space.

16. The user interface of claim 15, the rendering with de-emphasis includes at least one of dimming, blurring, fading, shading, broken lines, or watermarking of the one or more objects.

17. The user interface of claim 15, the top layer of the multi-layer graphical user interface is a conventional rendering of the one or more objects.

18. The user interface of claim 15, the one or more objects of top level information type correspond to a user's active application and the one or more objects of lower level information type correspond to notification indicators within a common display space of the user's active application.

19. The user interface of claim 18, the notification indicators represent at least one of a receipt of electronic communication, a system resource warning, or an appointment reminder.

20. The user interface of claim 15, the one or more objects of top level information type correspond to network Web sites and the one or more objects of the lower level information type represents a property or feature of the network Web sites.

* * * * *